(12) United States Patent
Henker

(10) Patent No.: US 11,334,324 B2
(45) Date of Patent: May 17, 2022

(54) SYSTEMS AND/OR METHODS FOR ERROR-FREE IMPLEMENTATION OF NON-JAVA PROGRAM CODE ON SPECIAL PURPOSE PROCESSORS

(71) Applicant: Software AG, Darmstadt (DE)

(72) Inventor: Uwe Henker, Reinheim (DE)

(73) Assignee: SOFTWARE AG, Darmstadt (DE)

(*) Notice: Subject to any disclaimer, the term of this patent is extended or adjusted under 35 U.S.C. 154(b) by 120 days.

(21) Appl. No.: 16/858,877

(22) Filed: Apr. 27, 2020

(65) Prior Publication Data

US 2021/0141613 A1  May 13, 2021

Related U.S. Application Data

(60) Provisional application No. 62/932,524, filed on Nov. 8, 2019.

(51) Int. Cl.
  *G06F 8/40* (2018.01)
  *G06F 8/30* (2018.01)
  *G06F 9/30* (2018.01)

(52) U.S. Cl.
  CPC .......... *G06F 8/315* (2013.01); *G06F 9/30058* (2013.01); *G06F 9/30101* (2013.01)

(58) Field of Classification Search
  CPC ..... G06F 8/30; G06F 8/31; G06F 8/41; G06F 8/51; G06F 8/76; G06F 9/4552
  See application file for complete search history.

(56) References Cited

U.S. PATENT DOCUMENTS 5,230,049 A    7/1993   Chang et al.
5,553,286 A    9/1996   Lee
           (Continued)

FOREIGN PATENT DOCUMENTS

EP   0348563   1/1990
EP   0740250   10/1996
EP   2610739   7/2013

OTHER PUBLICATIONS

Agner Fog, Instructions for objconv. Version 2.10 ("cof2elf.cpp"), Jul. 24, 2011, pp. 1-35 XP002675842 [retrieved May 9, 2012] URL:http://web.archive.org/web/20110724225859/http://www.agner.org/optimize/objconv.zip.

(Continued)

*Primary Examiner* — Duy Khuong T Nguyen
(74) *Attorney, Agent, or Firm* — Nixon & Vanderhye P.C.

(57) ABSTRACT

Certain example embodiments modify portions of a program, represented by object code stored in an executable, to be executed in a computing environment including general-purpose and special-purpose processors. Culprit calls in the object code deemed ineligible for execution by the special-purpose processor are identified. For each identified call: inserted into an allocated area are instructions that cause the program to temporarily cease executing calls using the special-purpose processor and instead execute an equivalent to the respective culprit call using the general-purpose processor, and return to executing calls using the special-purpose processor following execution of the respective culprit call using the general-purpose processor; and the respective identified culprit call is replaced with a branch instruction for the allocated area to cause the program to execute the inserted instructions rather than the replaced respective culprit call.

30 Claims, 7 Drawing Sheets

(56) References Cited

U.S. PATENT DOCUMENTS

| | | | |
|---|---|---|---|
| 5,640,550 A | 6/1997 | Coker | |
| 5,875,331 A | 2/1999 | Lindsey | |
| 6,061,519 A | 5/2000 | Rathnam | |
| 6,182,277 B1 | 1/2001 | Degroot et al. | |
| 6,484,309 B2 | 11/2002 | Nowlin et al. | |
| 7,254,807 B2* | 8/2007 | Sakata | G06F 8/41 717/136 |
| 8,352,947 B2 | 1/2013 | Laviolette | |
| 8,910,130 B2 | 12/2014 | Münster et al. | |
| 8,935,516 B2 | 1/2015 | Driscoll et al. | |
| 2001/0011371 A1 | 8/2001 | Tang | |
| 2002/0199174 A1 | 12/2002 | Tapperson | |
| 2004/0015834 A1 | 1/2004 | Mestre et al. | |
| 2006/0031820 A1 | 2/2006 | Li | |
| 2008/0059769 A1 | 3/2008 | Rymarczyk et al. | |
| 2008/0307392 A1 | 12/2008 | Racca et al. | |
| 2010/0115221 A1* | 5/2010 | Klein | G06F 8/445 711/169 |
| 2011/0035205 A1 | 2/2011 | Brideson et al. | |
| 2012/0110652 A1 | 5/2012 | Brown et al. | |
| 2012/0144157 A1* | 6/2012 | Crew | G06F 9/5066 712/30 |
| 2013/0174130 A1* | 7/2013 | Munster | G06F 8/76 717/136 |
| 2014/0096147 A1* | 4/2014 | Aarts | G06F 9/4484 719/320 |
| 2014/0244983 A1* | 8/2014 | McDonald | G06F 9/5044 712/225 |
| 2017/0286177 A1* | 10/2017 | Bishop | G06F 15/82 |
| 2019/0042288 A1* | 2/2019 | Hanumantharau | G06F 9/4552 |

OTHER PUBLICATIONS

Agner Fog, "elf2cof.cpp", Jul. 24, 2011, pp. 1-10, XP002677278 [retrieved May 9, 2012] URL:http ://web.archive.org/web/20110724225859/http://www.agner.org/optimize/objconv. zip.

Agner Fog, "cof2omf.cpp", Jul. 24, 2011, pp. 1-8, XP002677279 [retrieved May 9, 2012] URL:http://web.archive.org/web/20 11 0724225859/http://www.agner.org/optimize/objconv.zip.

Agner Fog, "omf2coff.cpp", Jul. 24, 2011, pp. 1-10, XP002677280 [retrieved May 9, 2012] URL:http://web.archive.org/web/20110724225859/http://www.agner.org/optimize/objconv. zip.

Agner Fog, "omf2cof", Jul. 24, 2011, pp. 1-11, XP002677281 [retrieved Jul. 24, 2011] URL:http://web.archive.org/web/20110724225859/http://www.agner.org/optimize/objconv. zip.

* cited by examiner

SYSTEMS AND/OR METHODS FOR ERROR-FREE IMPLEMENTATION OF NON-JAVA PROGRAM CODE ON SPECIAL PURPOSE PROCESSORS

CROSS-REFERENCE TO RELATED APPLICATION

This application claims the benefit of U.S. Application Ser. No. 62/932,524 filed on Nov. 8, 2019, the entire contents of which are hereby incorporated herein by reference.

TECHNICAL FIELD

Certain example embodiments described herein relate to techniques for error-free performance of code that is less than fully supported by special-purpose processors designed to accommodate only certain privileged code. More particularly, certain example embodiments described herein relate to techniques for error-free performance of code that is less than fully supported by special-purpose processors designed to accommodate only certain, privileged third-generation language (3GL) code, regardless of whether the other code to be accommodated is 3GL or 4GL (fourth-generation language) code. For instance, certain example embodiments described herein relate to techniques that automatically enable non-Java program code to be executed by special-purpose processors such as IBM System z Integrated Information Processor (zIIP) equipment.

BACKGROUND AND SUMMARY

Modern software projects typically comprise multiple programs interacting with each other. Typically, the programs are written in different programming languages such as, for example, Natural, C++ or Assembler. For instance, the core functionality of a complex program that can be used for monitoring technical processes such as the operation of a brake of a car may be created using a programming language specifically designed for that purpose. Related tasks, such as the presentation of a display about the braking action, are then performed by programs that are called as required and that could be realized in another programming language.

Another example of such a scenario is a complex monitoring program that communicates with a database in order to obtain certain data. However, the program does not instruct the database how this data has to be obtained. The actual steps of obtaining data from the database instead could be achieved by using another program written in another programming language. As another example, an Assembler program can provide the functionality for working with client certificates when calling web services from the underlying core program.

Programs that are typically used for executing specific tasks necessary for solving a problem are usually written in a third-generation language (3GL). A third-generation language provides a compiler to create executable files directly from source code, in some instances avoiding what oftentimes is considered cumbersome Assembler programming. The 3GL program usually needs to manage its own memory space and interaction with the operating system or hardware to a certain degree, directly. Examples of third-generation languages include Fortran, C++, COBOL, PLI, and Java.

By contrast, a fourth-generation language (4GL) typically is a higher-level language that provides a compiler, interpreter, and runtime environment to execute 4GL programs. In general, 4GLs provide better abstraction from the underlying hardware, operating system, and other computer specifics, and thus provide better independence from the computer system used. Examples of fourth-generation languages including Natural (available from the assignee), SQL, ABAP, and others.

A "core program" may make 3GL program calls, as needed. However, programs created in different programming languages may also require different runtime environments. For instance, certain calls involving databases, input/output (I/O) operations, and/or the like, may not be fully supported if written in 4GL code or unsupported 3GL code.

In a similar vein, a special-purpose processor designed to accommodate certain specific, "privileged" code/calls may be unable to accommodate "unprivileged" code and/or calls thereto. Privileged code typically includes (1) code provided, or at least authorized, by the party supplying the special-purpose processors, operating system (OS), and/or other infrastructure, and/or (2) code supported by the system's compiler and/or runtime environment(s). Moreover, in some cases, special-purpose processors designed to accommodate privileged 3GL code may be unable to accommodate calls made to 4GL code or code written in another third-generation language. As an example, a special purpose processor designed to accommodate certain Java code/function calls (which would be 3GL) might be unable to accommodate Natural code/function calls (which would be 4GL) and may be unable to accommodate COBOL code/function calls (which would be 3GL) because both would be considered unprivileged. By contrast, a system's own routines and calls thereto likely would be performable by its special-purpose processors and would be considered privileged.

It will be appreciated that it would be desirable to ensure that code, that is not fully supported by special-purpose processors designed to accommodate certain specific, privileged 3GL code, is able to execute properly, regardless of whether the former is 3GL or 4GL code. This may indeed be needed to help ensure that the full functionality of the program can be realized.

An IBM System z Integrated Information Processor (zIIP) is a special-purpose processor provided on an IBM System Z host. It was developed to handle specific computer processing situations, where a better-than-average performance is desired and/or required. For example, zIIPs are designed to operate asynchronously with General Processors in a mainframe to help improve utilization of computing capacity, e.g., in connection with select data and transaction processing workloads, for select network encryption workloads, etc. Because zIIPs are purpose-built, their usage is restricted to only certain types of code, as explained in greater detail below. In brief, although it is possible to quickly execute some code via zIIPs, in conventional arrangements, other code must be executed via General Processors.

Currently, z/OS is a 64-bit operating system for IBM mainframes. z/OS program load modules contain compiled program language code in machine code for the Cobol, PL1, Fortran, C/C++, and Assembler languages. These are examples of non-Java program code.

Non-Java program code cannot be run on a zIIP because the program language for neither the compiler nor for the Language Environment (LE) Runtime supports it. Currently, only Java programs including Node.js can be run on zIIP. This is a restriction imposed by IBM in connection with its zIIPs. In the IBM zIIP context, these restrictions imply what code and calls are deemed privileged.

Normally, non-Java program code runs on a Task Control Block (TCB), and not on a Service Request Block (SRB). A TCB is dispatched from a z/OS Work Load Manager (WLM) on a General Processor (GP). An SRB can be dispatched on a GP or on a zIIP. If the SRB should be dispatched on a zIIP, a special WLM-API (WLM Application Programming Interface) must be used.

Thus, it will be appreciated that the usage of zIIPs are restricted, and (as between a TCB and an SRB) only an SRB can run on it, imposing restrictions coming from the SRB processing. As a result, non-Java program code may run error-free only on a GP and cannot be guaranteed to share in the benefits of zIIP processing. This is an example of the issue described above pertaining to 3GL environments being unable to properly execute certain types of less than fully supported 3GL code.

It is at least in theory possible to force non-Java program code to be executed on a zIIP. But if non-Java program code is blindly executed on a zIIP, the chances are very high that the program will terminate with an error with the specific code S0F8, if this program issues (for example) any SVC (Supervisor Call) system calls. Further, the program may abnormally end (or "abend") with codes S0C1 (a Program Interrupt Code, Operation exception) or S0C4 (a Program Interrupt Code, Protection exception) if the program uses TCB-pointers on an SRB operating in the zIIP mode. Each of these errors is an example of a so-called abend. This means that non-Java program code cannot be reliably executed on a zIIP and will by default run on a TCB, dispatched on a GP, making it unable to realize advantages of the zIIP processing.

With regard to the latter, zIIPs have increased processing power with respect to their purpose-built functionality. Moreover, GPs are typically busy performing other computing tasks, and GPs typically are busier compared to zIIPs, which oftentimes means that a non-Java program will have to wait for GP dispatching from the WLM. zIIPs also run with unthrottled speed compared with GPs, which oftentimes means that the non-Java program code would run much faster on a zIIP as compared to a GP. Accordingly, it will be appreciated that it would be desirable to enable zIIPs to be used in connection with non-Java program code, including non-Java program code that otherwise would abend.

One aspect of certain example embodiments relates to addressing the above-described and/or other issues. For example, one aspect of certain example embodiments relates to techniques for error-free performance of code that is not fully supported by special-purpose processors designed to accommodate specific types of 3GL code, regardless of whether the less than fully supported code is 3GL or 4GL code.

Certain example embodiments help enable the use of zIIPs—in an automated fashion—in connection with a larger range of existing applications. For instance, using the techniques of certain example embodiments, zIIP-eligible non-Java program code can be executed on a zIIP, even when it otherwise would normally abend. Such program code runs much faster than non-zIIP-eligible non-Java program code. Advantageously, the likelihood of a system abend occurring as a result of execution on a zIIP of zIIP-eligible non-Java program code is reduced, and sometimes even completely eliminated.

In certain example embodiments, zIIP-eligible non-Java program code runs on an SRB, dispatched on a zIIP. The zIIP-eligible non-Java program code is embedded into a Natural CALLNAT function, which is identified as Natural Optimizer Compiler (NOC) code and later saved to the Natural System File (SF) for later activation. As is known, CALLNAT refers to a Natural Language Statement and, more particularly, a CALLNAT statement is used to invoke a Natural subprogram for execution. In certain example implementations, the Database Adabas (i.e., the Adaptable Database System commercially available from Software AG) or a VSAM (i.e., IBM Virtual Storage Access Method) file is used as the Natural SF storage. Neither the original source nor the compiled object code of non-Java programs will be modified as stored on disk in certain example embodiments. That is, the z/OS program load module, as available to non-Natural users, will not be changed in certain example embodiments.

As discussed in greater detail below, U.S. Pat. No. 8,910,130 helps provide a backbone for the example techniques discussed herein. The technology described in U.S. Pat. Nos. 8,935,516 and 8,352,947 also may be used in connection with certain example embodiments. The entire contents of each of the foregoing patents is hereby incorporated by reference herein.

In certain example embodiments, there is provided a method of modifying portions of a program to be executed in a computing environment including a general-purpose processor and a special-purpose processor. The program is represented by object code stored in an executable. Culprit calls in the object code are identified, with the culprit calls being calls deemed ineligible for execution by the special-purpose processor. For each identified culprit call: instructions are inserting into an allocated area that cause the program to temporarily cease executing calls using the special-purpose processor and instead execute the respective culprit call using the general-purpose processor, and return to executing calls using the special-purpose processor following execution of the respective culprit call using the general-purpose processor; and the respective identified culprit call is replaced with a branch instruction for the allocated area to cause the program to execute the inserted instructions rather than the replaced respective identified culprit call.

In certain example embodiments, there is provided a non-transitory computer readable storage medium tangibly storing instructions for modifying portions of a program to be executed in a computing environment including a general-purpose processor and a special-purpose processor. The program is represented by object code stored in an executable. The instructions, when performed, cause the computing environment to at least: identify culprit calls in the object code, the culprit calls being calls deemed ineligible for execution by the special-purpose processor; and for each identified culprit call insert into an allocated area instructions that cause the program to: temporarily cease executing calls using the special-purpose processor and instead execute an equivalent to the respective culprit call using the general-purpose processor, and return to executing calls using the special-purpose processor following execution of the respective culprit call using the general-purpose processor, and replace the respective identified culprit call with a branch instruction for the allocated area to cause the program to execute the inserted instructions rather than the replaced respective identified culprit call.

In certain example embodiments, a computing system is provided. The computing system includes a general-purpose processor and a special-purpose processor, as well as a program to be executed, with the program being represented by object code stored in an executable. The computing system is controllable to perform functionality comprising:

identifying culprit calls in the object code, the culprit calls being calls deemed ineligible for execution by the special-purpose processor; and for each identified culprit call inserting into an allocated area instructions that cause the program to: temporarily cease executing calls using the special-purpose processor and instead execute an equivalent to the respective culprit call using the general-purpose processor, and return to executing calls using the special-purpose processor following execution of the respective culprit call using the general-purpose processor, and replacing the respective identified culprit call with a branch instruction for the allocated area to cause the program to execute the inserted instructions rather than the replaced respective identified culprit call.

According to certain example embodiments, the object code may be stored in an object deck, and patch areas may be locatable as areas in which data needed for execution of the program initially is not stored.

According to certain example embodiments, the special-purpose processor may be configured to execute a subset of 3GL code (e.g., the special-purpose processor may be configured to execute Java code but not configured non-Java 3GL code such as COBOL).

According to certain example embodiments, equivalents to respective culprit calls may be implemented as transformed 3GL calls embedded into 4GL program headers callable from a 4GL runtime environment.

According to certain example embodiments, equivalents to respective culprit calls may be dispatched over a Service Request Block (SRB) to a special-purpose processor, e.g., with those equivalents potentially being embedded into a flagged Natural CALLNAT function.

According to certain example embodiments, the culprit calls may be identified as having one of a plurality of predefined types (e.g., database, input/output, and/or other calls).

According to certain example embodiments, for a given identified culprit call determined to have a known pre-programmed optimization, switching between executing calls using the special-purpose processor and the general-purpose processor may be controlled in accordance with the known pre-programmed optimization and the locating, inserting, and replacing may be omitted. The given identified culprit call in this case may relates to report writing in a loop, the known pre-programmed optimization may include local caching and switching upon a cache becoming filled and needing to be flushed, etc.

According to certain example embodiments, for a given identified culprit call, an external service may be called to determine whether a target of the given identified culprit call provides special-purpose processor eligible functionality; and in response to a determination that the target provides special-purpose processor eligible functionality, the given identified culprit call may be dispatched on the special-purpose processor and the locating, inserting, and replacing may be omitted. The target may be a database and the given identified culprit call may be a database-related function call. The service may be the database itself.

In certain example embodiments, there is provided a method of executing a program in a computing environment including a general-purpose processor and a special-purpose processor. The program is represented by object code stored in an executable. The object code having identifiable culprit calls located therein. The identifiable culprit calls are calls ineligible for execution by the special-purpose processor. The program is executed using the special-purpose processor. Responsive to each identifiable culprit call being encountered during execution of the program using the special-purpose processor: instructions are inserted into an allocated area that cause the program to temporarily cease executing calls using the special-purpose processor and instead execute an equivalent to the respective culprit call using the general-purpose processor, and return to executing calls using the special-purpose processor following execution of the respective culprit call using the general-purpose processor; and the respective identified culprit call is replaced with a branch instruction for the allocated area to cause the program to execute the inserted instructions rather than the replaced respective identified culprit call. Similar to the above, counterpart non-transitory computer readable storage media and computing systems are contemplated herein, as well.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1A:
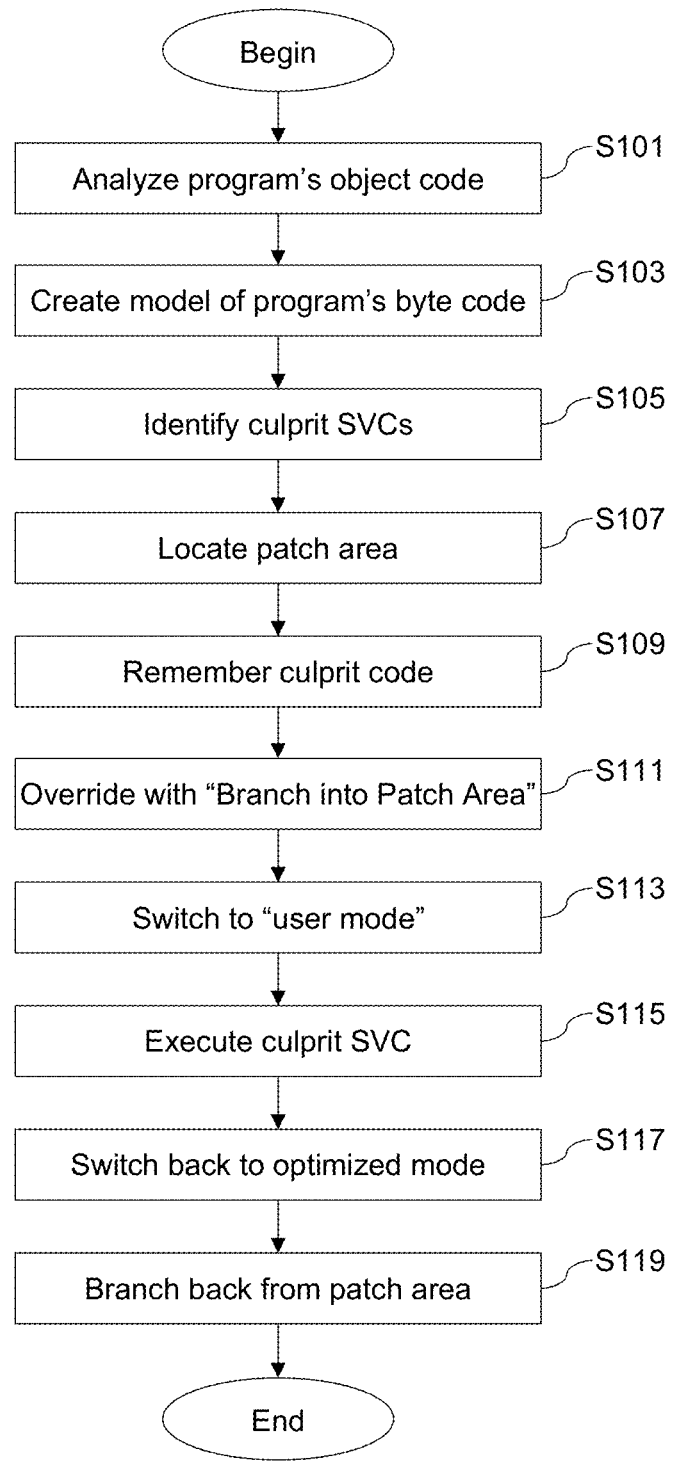
FIG. 1A is a flowchart showing an approach to executing less than fully compatible code in a special-purpose processor inclusive computing environment, in accordance with certain example embodiments.

Certain example embodiments described herein relate to techniques for error-free performance of code that is less than fully supported by special-purpose processors designed to accommodate only certain, privileged 3GL code, regardless of whether the less than fully supported code is 3GL or 4GL code. For instance, certain example embodiments described herein relate to techniques that automatically enable non-Java program code, including 4GL and/or otherwise not fully supported 3GL code, to be executed by special-purpose processors such as zIIP equipment.

Ordinarily, source code in a programming language is translated into machine code or byte code. In some computing environments (including in some mainframe implementations), the object code is the machine code, meaning that the object code, at least in theory, can be directly processed by the hardware processor(s) of the particular implementation. One example approach for creating an executable involves translating the source code into the machine code or byte code as an object deck. An object deck in this case may be thought of as being a collection of one or more compilation units produced by an assembler, compiler, or other language translator. The object deck may be in a relocatable format, typically with at least some machine code that is not executable.

In order to enable a program to achieve its full functionality, particularly in mainframe implementations, not all source code can be or is translated into standalone (executable) machine code. For example, database calls, input/output (I/O) operations, etc., typically are not translated into machine code executable on such systems.

One approach to dealing with this limitation involves maintaining a machine code layer and executing specific SVCs to enable more functionality to be realized. This may be accomplished by having a first runtime (e.g., the Natural runtime) create an "enclave" or layer, so that switching between the TCB and SRB becomes possible, e.g., as described in greater detail below. This approach, although desirable from the standpoint of enabling the program to execute properly, can have its drawbacks in that it could require larger and more complicated processing environments, etc.

In the case of IBM zIIP technology, for example, 3GL code can run on special-purpose zIIPs. Some supervisor functions can be executed under zIIP. This enables zIIP-enabled programs to be executed quite quickly, taking advantage of the processor optimizations. Yet even though some machine code functionality is enabled, certain functions still cannot be executed, e.g., when related to database calls, I/O functionality, etc. These limitations can be handled in a manner similar to the above. That is, basic interpretation of the machine code is possible, and object code can be executed, but the zIIP processing environment will be encapsulated in a machine code layer. For instance, in certain example embodiments, execution of "optimized" COBOL or other code within the Natural runtime may be enabled. In a similar vein, certain example embodiments may "interpret" code such as Natural or Java code with the same conditions. In this case, the code that "executes" is now an interpreter that switches between the zIIP and GP.

FIG. 1A is a flowchart showing an approach to executing less than fully compatible code in a special-purpose processor inclusive computing environment, in accordance with certain example embodiments. In step S101, a program's object code is analyzed. A model of the program's code is created in step S103. The particular code examined here may be the program's object code (typically something that is the result of a translation) or byte code. The source code therefore need not be analyzed in certain example embodiments, as the object code may already be understandable. And the ability to work with object code directly could be advantageous because the source code may not be available. COBOL source code, for example, typically will be compiled into machine code (in assembler) that is directly executable but nonetheless understandable and subject to analysis for these operations. A Natural program, on the other hand, can be compiled into "meta" or "byte" code, which instead will be interpreted at runtime and also can be understood and analyzed for these operations. Machine instructions typically will not be found in Natural byte code. However, there is a Natural Optimizer Compiler (NOC), which includes a compile-time component. The compiler may check whether specific parts of the Natural byte code can be directly converted into machine code (e.g., mathematical instructions can easily be translated). One benefit is that the code does not need to be interpreted at runtime, making it faster. The Natural runtime thus may see an "NOC Optimized" flag and basically sets the PSW (program status word, i.e., the execution pointer) into the next set of instructions that had been optimized via the NOC. An exit routine may be provided to switch back to the normal interpreting, once the NOC optimized code ends and the normal Natural byte code continues. Further details regarding NOC optimizations, flags, etc., are provided below. In the meantime, however, it will be appreciated that the Natural runtime is capable of executing the object "directly"—and the Natural runtime is in essence led to believe that it executes a NOC compiled Natural program. This ultimately looks identical or nearly identical to the zIIP-enabled object code, and the runtime functionality is expanded mainly by the zIIP switching routines. In any event, the analysis in step S101 may ensure that the model created in step S103 indicates where branches caused by if statements, loops, and/or the like, are located.

"Culprit" function calls of the object code (e.g., SVCs) that are likely to cause a special-purpose processor such as a zIIP to abend are identified in step S105. This step in essence looks for function calls of the object code that cannot be reliably executed if the program code is provided to the special-purpose processor. In this regard, although certain example embodiments discuss SVCs as being one specific type of "culprit," it will be appreciated that there are other types of "culprits," which more broadly may be any potentially problematic (e.g., unprivileged) code and/or calls, such as, for example, SVCs, Program Calls (PCs), callable IBM as well as callable external customer routines (e.g., V-CONS) provided specifically for zIIP processors, etc. Thus, although SVCs are used to demonstrate how certain example embodiments may operate, it will be appreciated that the example techniques set forth herein have applicability beyond merely looking for and dealing with culprit SVCs. To perform this identification, indicators corresponding to codes likely to "break" the special-purpose processing mode and thus require a mode switch are identified. Because the code is understood and a model representing how the object/program code functions is created, parts of the model that are potentially problematic (such as those indicators corresponding to database calls, I/O operations, etc.) can be easily identified by traversing the model in advance or even in real-time just prior to execution of the program (e.g., on-the-fly using Java just-it-time (JIT) compiling, etc.). For example, the traversal of the model may scan for indicators in the object/byte code using a predefined list of known culprit types.

Rather than attempting to fix or have special handlers for errors, the FIG. 1A example process ultimately enables the switching of modes from a fast-executing special-purpose mode to a general processing mode. For example, a 3GL application can be executed under an additional shell. In this sense, in a conventional arrangement, an operating system will provide a 3GL runtime for a 3GL application (e.g., an IBM OS will provide a COBOL runtime for a COBOL application). By contrast, in certain example embodiments, an OS will provide a set of tools that amount to a shell for a 3GL runtime in which a 3GL application can execute (e.g., an IBM OS will operate with a Natural runtime providing a shell for a 3GL COBOL runtime to enable a 3GL COBOL application to be executed). In some instances, it is convenient to enable a transformed 3GL program to be implemented as a part of a 4GL program in a 4GL runtime environment, as described in greater detail below.

The culprit code is effectively removed from the execution path of the special purpose processor. In certain example embodiments, the culprit code can, in effect, be replaced with a branch to a suitable "Patch Area." A Patch Area that has a sufficient amount of available space for the insertion of certain additional program codes, as described in greater detail below, can be located, as indicated in step S107. Typically, each object created has a Patch Area in the object deck or other created structure. The Patch Area generally includes several hundred bytes around an object, and these bytes do not include data required for execution. Thus, other information can safely be written to the Patch Area. It will be appreciated that although the term "Patch Area" is used herein, different programming languages, compilers, implementations, third-party providers, etc., may apply a different term to the same or similar concept. It is understood, however, that the example techniques disclosed herein apply to these "areas" as well, and the term "Patch Area" is used generically throughout this document for ease of understanding unless expressly stated otherwise.

The instruction to branch into the appropriate Patch Area typically can be specified in 4-6 bytes, which may require more space than a culprit call (which typically can be specified in 2 bytes). Thus, it may be necessary to "move" some instructions surrounding the culprit into the Patch Area as well to free up enough space for the branch instruction. In certain example embodiments, one or more instructions before and/or after the culprit may be moved to the Patch Area. The identification of the Patch Area noted above may return data indicating the location and offset into the Patch Area where execution is to resume. The culprit code (and any surrounding instructions to be moved with it) is identified and "remembered," as indicated in step S109. Thus, the branch into the Patch Area may be accomplished, in essence overriding the processing via the special-purpose processor, as indicated in step S111.

The Patch Area may have inserted therein instructions for accomplishing the mode switch from special-purpose processing mode to GP processing mode (step S113), making the culprit call while in the GP processing mode (step S115), making the mode switch back to the special-purpose processing mode (step S117), and returning to the execution path safely for continued execution in the special-purpose processing mode (step S119). The particular Patch Area located may in certain example embodiments be the next available or "closest" Patch Area with sufficient space for these instructions. If the size of a culprit call exceeds the available Patch Area space, or if there are multiple culprit calls in sequence that would require more than the available Patch Area space, special handling may be provided. For instance, certain example embodiments may take advantage of the fact that the Natural Load Module Converter (NATLMC), which is discussed in greater detail below, later stores the new object code (e.g., the new COBOL object code) in the Natural system file. This makes it possible to increase the complete size of the module as needed or desired, e.g., to accommodate further instructions. In this approach, the original object code need not be overwritten on disk. Instead, in certain example embodiments, a patch area can be created in memory, dynamically, as needed or as desired. For instance, a patch area can be dynamically created in memory at the end of the loaded object code, expanded as needed, and then the complete new object code can be saved into the Natural system file. This approach may be advantageous in certain example embodiments because the Natural system is used in concert with available memory space, avoiding the need to override the original object code. The original object code can be maintained "as is."

Figure 1B:
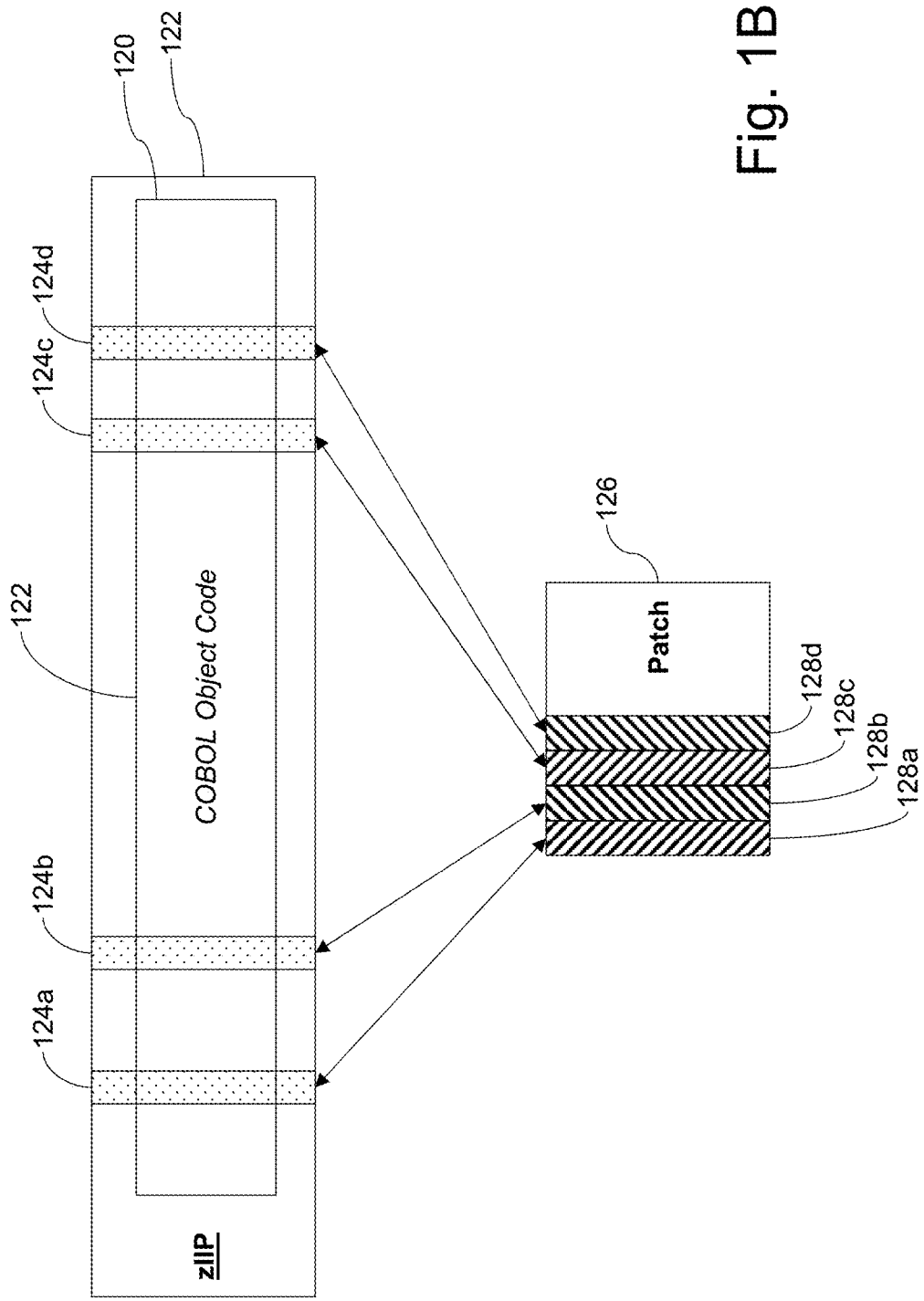
FIG. 1B is a schematic view representing how processing following the FIG. 1A flowchart may take place, in accordance with certain example embodiments.

In the case of zIIP computing environments, for example, SVCs may be culprits that implement calling a database, performing I/O operations, and/or the like. The special-purpose processing mode mentioned in FIG. 1A thus may be zIIP execution. In this regard, FIG. 1B is a schematic view representing how processing following the FIG. 1A flowchart may take place, in accordance with certain example embodiments. As shown in FIG. 1B, COBOL object code 120 is being executed on a zIIP processor 122. The dotted areas 124a-124d represent processing portions that may not be appropriate for execution via the zIIP processor 122, e.g., because the COBOL object code 120 here might represent a culprit call or the like. Thus, there may be a branch to the (potentially growable) patch area 126 for each of these dotted areas 124a-124d, triggering a context switch for execution by the GP as indicated by the diagonal line areas 128a-128d. In this regard, there is a first branch 124a to a first alternate execution area 128a, which switches to GP processing for the culprit code; executes the culprit code using the GP; switches back to zIIP processing mode, and returns to zIIP execution (of the COBOL object code 120) after the first branch instruction 124a. Processing of the COBOL object code 120 continues using the zIIP processor 122 until the second branch instruction 124b is reached, signifying the presence of another culprit. Then, there is a branch into the patch area 126 for the second alternate execution area 128b, which again switches to GP processing for the culprit code; executes the culprit code using the GP; switches back to zIIP processing mode, and returns to zIIP execution (of the COBOL object code 120) after the second branch instruction 124b. This continues for the continued execution of the COBOL object code 120.

It will be appreciated that this example approach may in certain example instances make the executable larger and/or more complex, as additional instructions may be added, some existing instructions may be duplicated, etc. However, the ability to run more code through the zIIP may make the overall execution much faster than it otherwise would be.

As alluded to above, execution of programs may be modified to include culprit-handling functionality prior to execution (e.g., at pre- or post-deployment pre-execution phases), and/or in real-time just prior to execution (e.g., on-the-fly via JIT or the like). Specifically, the techniques disclosed herein may be used to create a modified executable before execution, or the execution may be modified in real-time by modifying instructions held in memory.

Culprits can be identified by any suitable technique. For instance, in certain example embodiments, culprits can be identified as being any code written in a less than fully supported language (e.g., that is "shelled" to), as involving a call of a known type (e.g., based on a predefined list), etc. In certain example embodiments, multiple culprits can be flagged by creating a complete model of the executable. This may be advantageous because adjacent culprit calls can be handled in the context of a single mode switch procedure, rather than having to resort to multiple Patch Area branches and mode switches for each branch. In a similar vein, a determination may be made as to whether proximate culprit calls should be handled in the context of a single mode switch procedure. For instance, it may be desirable to rely on a GP for one or more intervening zIIP-eligible calls to be made between two culprit calls even though the intervening calls may be executable using the special-purpose processor, e.g., if it would be more effective from processing time and/or resources perspectives to execute the intervening call(s) using the slower processor mode given the amount of time and/or resources that could be involved in multiple mode switches. Heuristics involving the number and/or types of calls, expected mode switches, and/or the like, may be developed for determining when it is desirable to "save" a mode switch and simply execute special-purpose processor eligible instructions on the GP.

In certain example embodiments, if a culprit is detected but it is known in advance that it can be handled more gracefully than requiring a mode switch in line with the FIG. 1A example flowchart and related discussion above, it is possible to call a custom optimization process to supplement or supplant this mode switching approach of FIG. 1A. For instance, if code for writing a report within a loop requires I/O to the machine all at the same place within the program, as might be the case when generating log output, it may be desirable to call a custom optimization process instead of performing the FIG. 1A method. In this case, an existing call could be used to write report or log entries to an in-memory or other appropriate buffer, which could be flushed periodically or when filled. The writes to the buffer could be accomplished without a mode switch, and the periodic or necessary flushing of the buffer could be performed in connection with a mode switch. Doing so would require fewer mode switches and facilitate more processing cycles in the special-purpose processor mode, improving performance of the program. Certain example embodiments therefore may identify culprits, determine whether there are known internal mechanisms for mode switching associated with those culprits, and, if so, replace any such identified culprits with the appropriate internal mechanism(s) associated therewith.

In certain example embodiments, culprits may be identified as being potentially problematic, e.g., based on type. However, in some instances, not all identified culprits will trigger an abend, e.g., because a computer system being interacted with may have special built-in handling appropriate for the special-purpose processor. Certain example embodiments therefore may identify candidate culprit code but determine that in the particular environment in which the code is running, the candidate is not in fact a culprit. In essence, then, certain example embodiments thus may look for culprits and exceptions for culprits. As an example, database codes typically run outside of zIIP processing environments, but some database calls can in fact take advantage of zIIP processing. Certain example embodiments thus may in essence ask the implicated database whether it is zIIP-enabled or whether the particular code must run in "user mode." If the database indicates that the code must run in the user mode, the procedure described above in connection with FIG. 1A can be used. On the other hand, if the database is zIIP-enabled, the FIG. 1A processing approach may be omitted. In certain example embodiments, this query may be accomplished by simply calling an external service to determine whether the mode switch is needed. The external service in this instance may be the database itself, a remote service storing information about potential compatibilities as between the host environment, the target environment, the particular call to be made, etc.

Example Implementation

Details concerning an example implementation are provided below. It will be appreciated that this example implementation is provided to help demonstrate concepts of certain example embodiments, and aspects thereof are non-limiting in nature unless specifically claimed. In this regard, details concerning an example implementation are provided in connection with Natural and zIIP processors, the former being a 4GL and the latter being suitable for executing certain privileged 3GL Java code. In this example, Natural provides a framework with tools, both for design/compile time and runtime, that make it a convenient "backbone" or technical infrastructure for certain example embodiments. For instance, at some initial time (e.g., which might just be the first time a user executes a program including unprivileged calls such as a COBOL program PgmA), the techniques of certain example embodiments involve loading the binary executable of PgmA and analyzing and changing the binary code using Patch Areas and the like as outlined above and as detailed below. PgmA will be executed through the Natural runtime (which is different from normal execution, e.g., because the normal behavior for the Natural runtime is to "interpret" a program, and normally only NOC-enabled programs are (in part) directly executed) and, when certain runtime calls in PgmA are to be executed by the zIIP processor, then helper routines in the Natural runtime are called in order to "help" processing, e.g., by performing the "privilege switch" to and from zIIP processing mode for different operations, potentially executing optimizations as described below, etc. It will be appreciated that the use of Natural, zIIP processors, Assembler or COBOL programs, etc., are merely example implementation details and are not limiting unless explicitly claimed. That is, the techniques disclosed herein can be used in connection with different special-purpose processors, different runtime environments, different privileged and unprivileged code types, etc.

U.S. Pat. No. 8,910,130 describes example infrastructure, based on the Software AG product Natural, which may be used in connection with certain example embodiments. More particularly, the transformation of a 3GL-CALL into a 4GL Natural CALLNAT may be used in connection with certain example embodiments.

Figure 2:
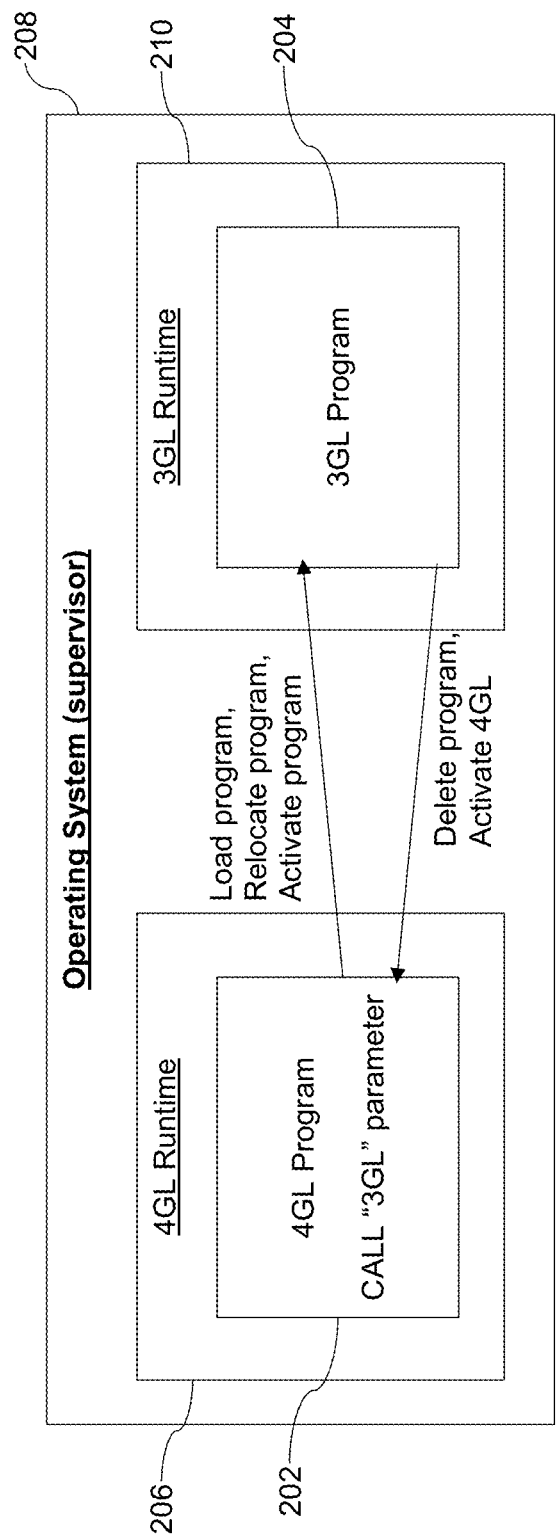
FIG. 2 is a block diagram showing an example 4GL program invoking a 3GL program.
Figure 3:
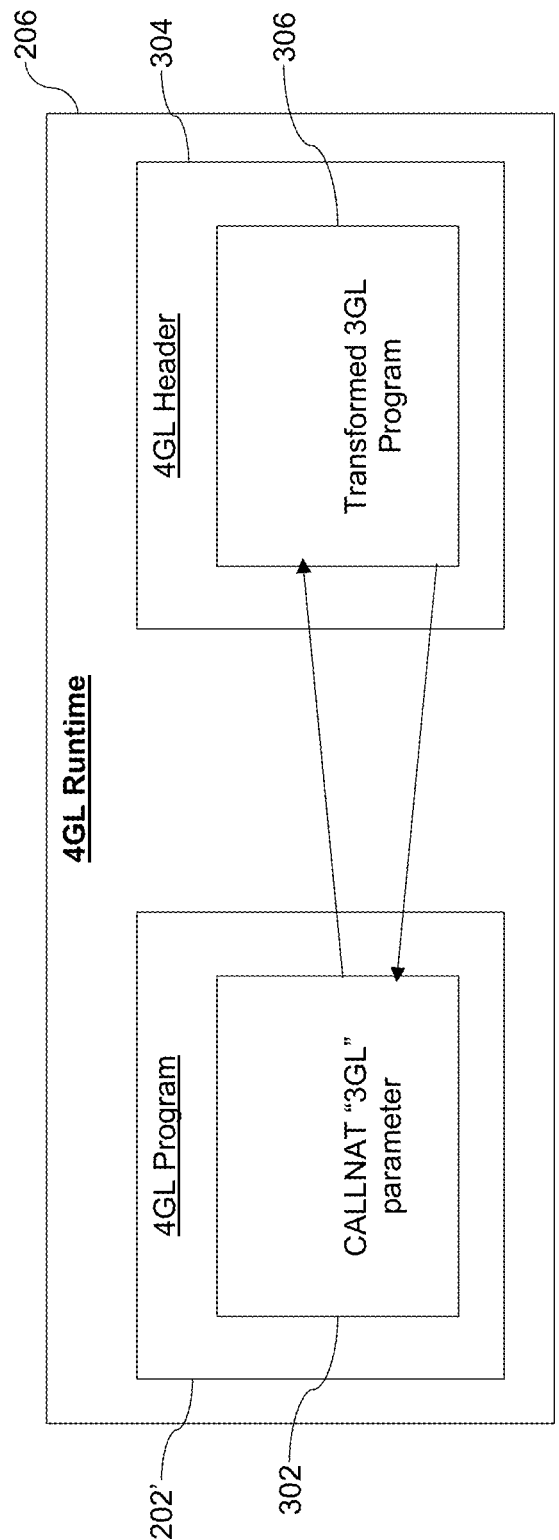
FIG. 3 is a block diagram showing an example 4GL program invoking a 3GL program under a 4GL runtime environment.

Using techniques disclosed in the '130 patent, a 3GL non-Java program can be transformed into a Natural CALLNAT following the approach described therein and which can be understood from FIGS. 2-3. FIG. 2 is a block diagram showing an example 4GL program 202 invoking a 3GL program 204, and FIG. 3 is a block diagram showing an example 4GL program 202 invoking a 3GL program 204 under a 4GL runtime environment 206.

In FIG. 2, the operating system 208 includes the 4GL runtime environment 206 and the 3GL runtime environment 210. The 4GL runtime environment 206 and the 3GL runtime environment 210 provide a program with functions needed for execution on the operating system 208. In other words, the programs may need specific environments to operate. In FIG. 2, when a core program such as a 4GL program 202 invokes another program such as a 3GL or Assembler program 204 with a command (e.g., a CALL statement), a change of the runtime environment is performed. This may involve a context switch from the 4GL runtime environment 206 to the 3GL runtime environment 210. Specifically, the 3GL or Assembler program 204 is loaded in the 3GL runtime environment 210, the program execution is relocated, and the 3GL or Assembler program 204 is executed. When it is finished, the 3GL or Assembler program 204 is deleted, and the 4GL program 202 is activated.

In contrast with FIG. 2, in FIG. 3, the 4GL runtime environment 206 executes a modified 4GL program 202' and invokes a transformed 3GL and/or Assembler program 306. Here, the 4GL runtime environment 206 fetches a respective transformed 3GL and/or Assembler program 206 by using a modified call statement 302 in the modified 4GL program 202'. During execution of the 4GL program 202', the call statement 302 invokes the transformed 3GL program 306 by calling the 4GL header 304 of the transformed 3GL program 306. The 4GL runtime environment 206 thus is able to invoke the transformed 3GL program 306 as a 4GL object (e.g., as a 4GL CALLNAT object, if Natural is used as 4GL language). Then, the 3GL program 306 may be executed under the 4GL runtime environment 206 of the calling 4GL program 202'. After the transformed 3GL program 206 has finished, the execution of the 4GL program 202' continues. In this way, context switches can be avoided.

To help cope with the above-mentioned deficiencies of executing an arbitrary non-Java program (including the likelihood of experiencing an Abend S0F8 and/or Abend S0C1/S0C4), the machine code will be carefully checked to determine whether any kind of these situations is likely to arise. This involves a staged approach in which, in certain example embodiments:

1. The execution state of the running program is to be switched forward and backward at the problematic instructions into and then later back from the zIIP.
2. Optimization of larger portions of the program is preferably carried out, because of the additional overhead of the switching code. For example, specific loops that are detected at the analysis phase that require forward and backward switching can be locally cached, and the switching can mostly be avoided. An example could include a program loop that contains a (non-zIIP eligible) Write to a work-file or print-file.
3. In some specific cases, where it is possible to execute a database call in the zIIP (examples could include DB2 and Adabas), the switching can also my optimized. DB2 refers to IBM Database 2, a relational Database Management System.

Figure 4:
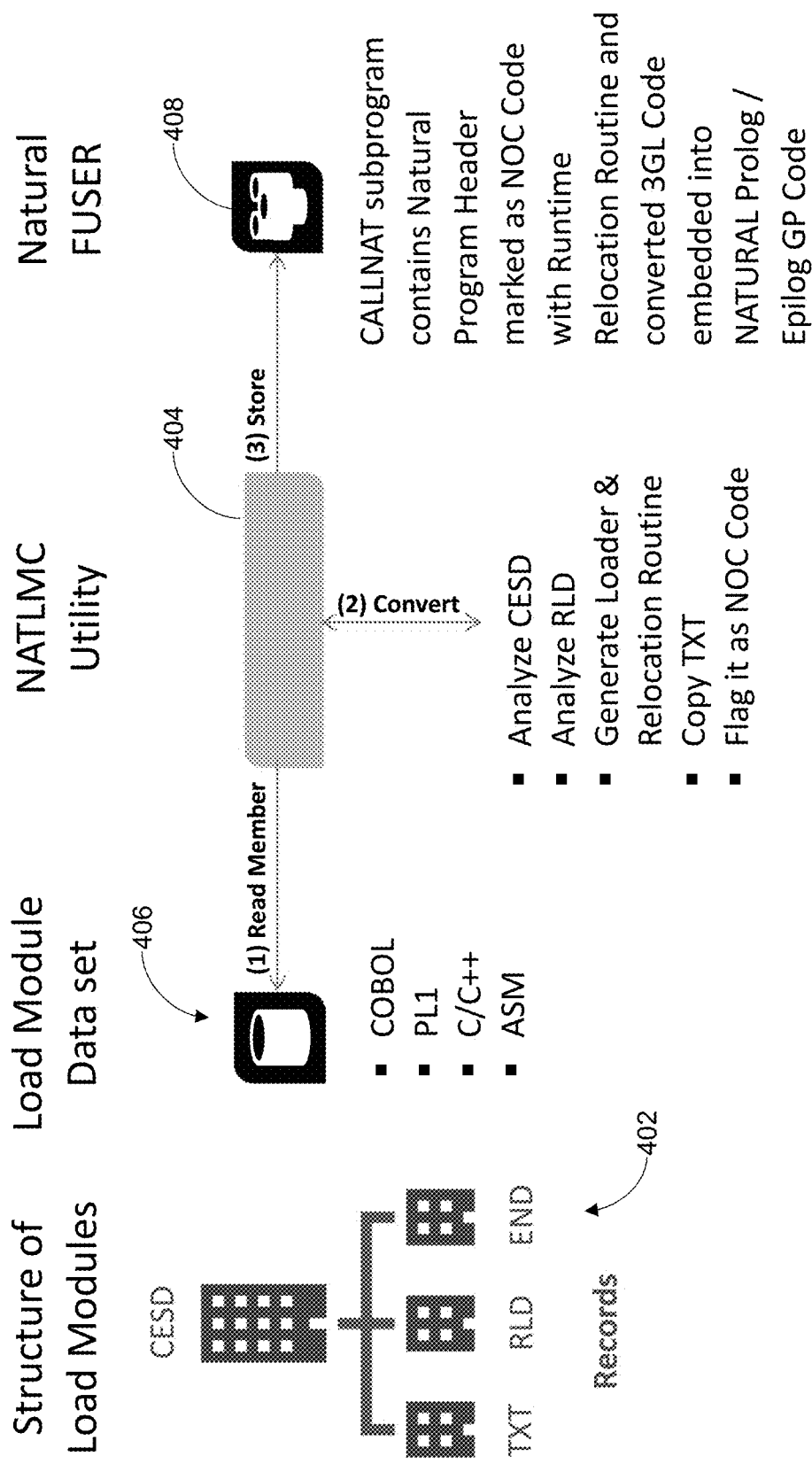
FIG. 4 schematically shows components that may be used to transform a 3GL CALL into a Natural CALLNAT using a Natural Load Module Converter (NATLMC) running on z/OS, which may be used in connection with certain example embodiments.

FIG. 4 schematically shows components that may be used to transform a 3GL CALL into a Natural CALLNAT using a Natural Load Module Converter (NATLMC) running on z/OS, which may be used in connection with certain example embodiments. It will be appreciated that preparatory processing steps as disclosed in the '130 patent may be implemented here, in addition to the operations described below (e.g., see operations that make it possible to "include a Natural program header in the executable code", as well as other operations disclosed in, for example, the '130 patent). The NATLMC of certain example embodiments may be implemented as a computer software program module executing on a computing system including at least one processor and a memory. As will be appreciated from the description here, NATLMC is a Natural standalone utility that is typically executed on request by a user (typically an administrator) to transform the 3GL non-Java (e.g., COBOL) or other code into a zIIP-eligible Natural optimized program.

On the left side of FIG. 4, the structure 402 of a z/OS load module (e.g., a non-Java compiled program) is shown. The NATLMC Utility 404 [the "Load Module Converter"] loads the load module 406 from a PDS or other file, e.g., to obtain the non-Java code in COBOL, PL1, C/C++, Assembler, or the like.

Once the load module 406 is loaded, the NATLMC Utility 404 also performs the following functions:
(a) Analyze the CESD, which is the External Symbol Definition (ESD) record format for load modules, e.g., in order to identify the VCONS, ACONS, etc., and identify routine names (i.e., detect whether IBM-proprietary routines or user defined routines are called);
(b) Analyze the relocation directory (RLD) to resolve offsets inside the program after it is loaded into the Natural buffer pool program;
(c) Generate loader and relocation routine (see the techniques set forth in the '130 patent, for example);
(d) Copy the machine language instructions and data record (TXT), i.e., load the machine code into the CALLNAT area; and
(e) Flag the complete modified object code as being "executable" as Natural Optimized Compiler (NOC) code. It will be appreciated that this flag operation is optional in the sense that certain example embodiments may simply record or otherwise "remember" that an optimization has been performed and that the executable need not be "re-optimized." It also will be appreciated that an optimized executable created in this example implementation can be executed under the Natural runtime discussed above.

The newly generated program (including the IBM standard program conventions like Prolog-/Epilog-handling, as well as the Runtime Relocation Routine disclosed in the '130 patent) is saved. For instance, in certain example embodiments, a CALLNAT subprogram may be created to contain a Natural Program Header marked as NOC Code with a Runtime Relocation Routine and converted 3GL Code embedded into NATURAL Prolog/Epilog GP Code. This may be accomplished using the Natural System File for Users parameter, FUSER 408, or any other suitable parameter or programmatic means available.

The following text describes how the modified non-Java program (e.g., the machine code) can be handled by the Natural infrastructure in certain example embodiments. For example, the transformed 3GL non-Java program code will be saved as a Natural CALLNAT subprogram on the Natural SF "FUSER". This CALLNAT is marked as NOC (Natural Optimized Code) in the Natural Program Header for this Natural object. FUSER here is the Natural System File FUSER. As noted above, the Natural implementation is provided by way of example and without limitation. Other runtime environments, call types, flags, header objects, and/or the like, may be used in different example embodiments.

The following text also provides details of how the non-Java program code is analyzed and transformed, so that large parts of the code can be executed in the zIIP (also termed as "being zIIP-eligible") without failing and terminating with an abend code. Normally, most of these non-Java program codes contain system calls like Supervisor Calls (SVCs) or calls into the IBM Language Environment (LE) Runtime, which is not zIIP-eligible. This implies that, by default, a non-Java program cannot make use of the advantages of the zIIP.

Certain example embodiments include a "Code Analyzer" (which may be a part of NATLMC), which will check the following culprits (e.g., functions that are not zIIP-eligible) inside the non-Java program code: find all system calls like SVC; find all IBM callable routines (LE, DB2, VSAM, . . . ); and find all IBM Control Block (CB) pointer checks that are not available on SRB. The Code Analyzer of certain example embodiments may be implemented as a computer software program module executing on a computing system including at least one processor and a memory.

If any of the above functions have been detected, an internal culprit table will be built with the following properties: type of the culprit (e.g., SVC, IBM Call, CB check); offset of the culprit function relative (for example) to the beginning of the non-Java program code; and original code to be replaced with the code of the Natural TCB/SRB switch handler calls (this is typically up to or equal to 8 bytes, but could vary in different example implementations).

In a second phase, the culprit table will be used and the non-Java program code (e.g., the machine code, which was already loaded by the NATLMC) will be modified in place by the "zIIP Code Enabler". Again, this may be implemented as a computer software module or the like.

All identified culprit functions will then be "embraced" by Natural TCB/SRB switch handler routine calls or by Program Calls (PCs) for SRB-eligible SVC system calls. However, the original, but now replaced code, will be invoked after or before the switch, depending on whether a switch is made from the (default) zIIP into normal user mode (TCB), or whether a switch is made back into the zIIP-eligible part.

This switch routine includes a call into the Natural runtime, which will invoke a PC-based Natural authorized service routine to create a zIIP SRB-enclave, if not already allocated, and issue the requested mode switch into either SRB mode (switching to zIIP-eligible) or into (non zIIP-eligible) TCB mode. An enclave in this sense is a group of one or more logically related z/OS TCBs and SRBs that manage the work in entities.

The necessary TCB/SRB switches will be classified and logged in a "zIIP Component Report," which also includes the number of classified TCB/SRB switches for the non-Java program code. This will be done for the second and/or third parts of the staged approach mentioned above in certain example embodiments.

Preventively, a so-called Natural private abend handler (element 618 in FIG. 6) (via the standard IBM abend handler for TCB and SRB processing) will be appended after the Natural TCB/SRB switch handler routine as part of the Natural CALLNAT to intercept any incorrectly analyzed code parts in the non-Java program code, which would lead to a S0F8 Abend. This SRB abend handler for the zIIP SRB enclave will be defined in the Natural Runtime routine that creates the SRB enclave. If there are no private abend handlers, Natural will terminate using its normal abend exit handlers. This may not be desirable because the non-Java code may not have been properly analyzed. Accordingly, a private abend handler instead will intercept the termination, create a report, and continue execution using the TCB. In other words, because of the private abend handlers, if there is an abend during SRB execution, then a specific abend handler will switch back to TCB mode execution and continue executing using the TCB because of the error. Execution then can continue, using the TCB, until the next switch.

Thus, the Natural defined SRB abend handler will percolate to a pre-defined TCB abend handler, if any.

The workflow thus is as follows:

1. Disassemble all non-Java program code TXT-cards from the z/OS load module (i.e. the programs compiled machine code) to find out all SVCs (Assembler code=X'0Axx', xx is the SVC-Number); i.e., the "culprits".
2. Build culprit-table, containing
   a. SVC-Number/IBM Call routine, etc.
   b. Offset inside non-Java program code.
   c. Save necessary bytes of non-Java program code beginning with the SVC (to be overridden later for the switch code).
3. Add the Natural TCB/SRB switch handler routine at the end of the non-Java program code inside the Natural CALLNAT area.
4. Check all identified SVC-Numbers in the culprit-table for any of the IBM SRB-eligible APIs (WTO, WTL, GETMAIN, FREEMAIN). WTO is the z/OS System Call Write To Operator, WTL is z/OS System Call Write To Log, GETMAIN is the z/OS System Call Getmain Storage, and FREEMAIN is the z/OS System Call Freemain Storage.
   a. If yes, then replace this SVC with the corresponding PC for the appropriate System Services that is zIIP-eligible and delete this entry in the culprit-table.
5. Set an End-of-SVC indicator in the culprit-table. End here may be the end record of a module.
6. Disassemble again all non-Java program code TXT-cards (i.e., the machine code) from the z/OS load module to identify all TCB-pointers coding via the z/OS Prefixed Save Area (PSA) (field PSATOLD, Assembler code=X'58x0021C', (where 'x' is the used Register). PSA is the z/OS Prefixed Save Area, owned by Supervisor.
   a. If found, add a Natural PSATOLD handler routine at the end of the already appended Natural TCB/SRB switch handler routine.
   b. Replace the identified PSATOLD instruction in the non-Java program code with an Assembler Branch instruction into the Natural PSATOLD handler routine.
   c. The Natural PSATOLD routine will pick up the TCB address via the Natural Driver I/O Block (IOCB) field TCBADDR and return it to the non-Java program code.
7. Scan CESD records to find out all resolved V-addresses for IBM callable routines (LE, DB2, VSAM, . . . ) used in the non-Java program code. Disassemble again all non-Java program code to find out the specific call(s) into this newly identified IBM routine and add a new entry in the culprit-table with the following layout.
   a. Resolved address for the IBM callable routine.
   b. Offset inside non-Java program code.
   c. Saved necessary bytes of non-Java program code beginning with the Branch instruction.
8. Loop over the "SVC and IBM-call" culprit-table.
   a. Add a so-called Patch Area after the end of the already appended Natural PSATOLD handler routine, if they exist by now, or after the Natural TCB/SRB switch handler routine
   b. Pick up the saved offset in the non-Java program code and replace the following code beginning with the SVC or Branch instruction to the callable the IBM routine with an Assembler Branch instruction into the current entry in the Patch area.

c. The current Patch area entry has the following layout
   i. Call the Natural TCB/SRB switch handler routine to go into TCB-mode.
   ii. Issue the identified and saved original SVC or call the IBM routine, plus the replaced and saved code from the non-Java program code.
   iii. Call the Natural TCB/SRB switch handler routine to go into SRB-mode again.
   iv. Return to the original non-Java program code offset after the replaced SVC or the Branch instruction to the callable IBM routine.
9. A Natural private abend handler routine will be added at the end of the Patch area to avoid an unexpected abend resulting from the modified coding in the non-Java program code.
   a. If an unexpected abend occurred, then switch into the TCB-mode and retry the abended instruction on TCB.
10. The entries for the zIIP component report will be built at runtime (execution of the non-Java program code) during the call to the Natural TCB/SRB switch handler routine inside the Natural runtime in certain example embodiments.
11. The culprit-table will be saved together with the modified non-Java program (machine code) on the Natural SF "FUSER" in a dedicated library called "NATLMC". This serves for documentation purposes only, in certain example embodiments.

Figure 5:
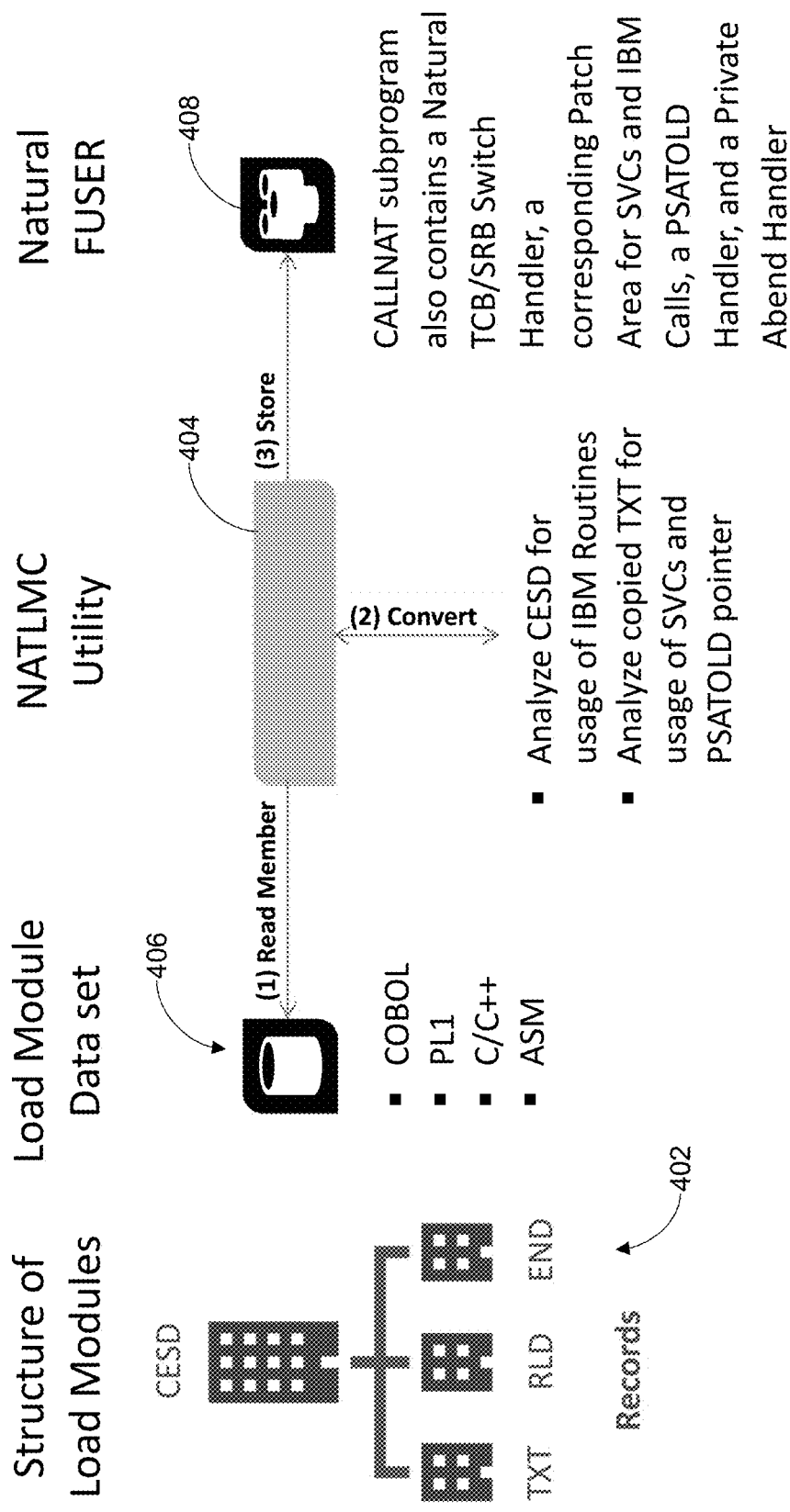
FIG. 5 schematically shows components that may be used to make non-Java program code zIIP eligible, in accordance with certain example embodiments.
Figure 6:
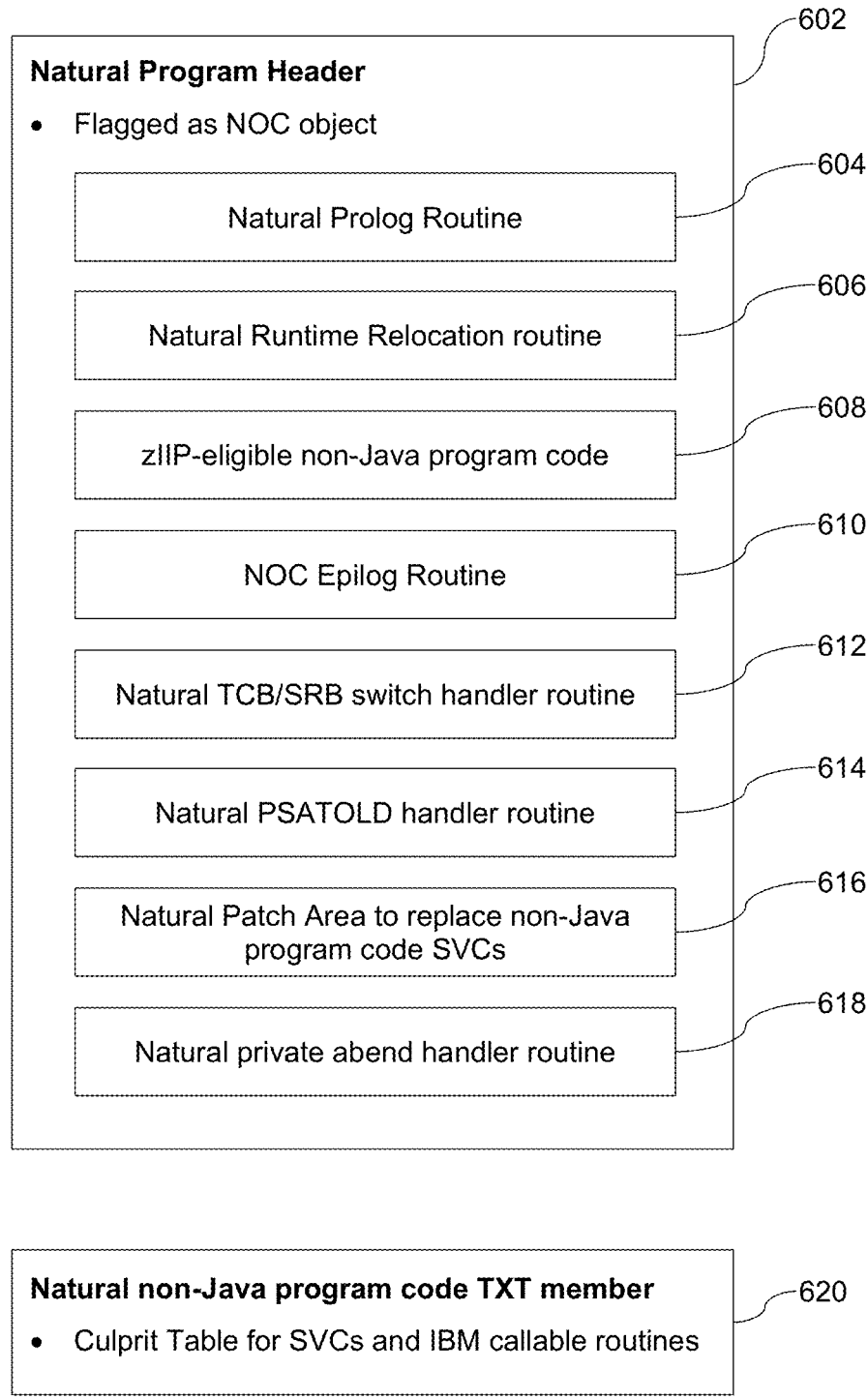
FIG. 6 schematically shows an example CALLNAT structure for zIIP eligible non-Java program code.

This procedure is summarized in FIG. 5, which schematically shows components that may be used to make non-Java program code zIIP eligible, in accordance with certain example embodiments. The similarity between FIG. 4 and FIG. 5 helps demonstrate that a common architecture can be used. The resulting CALLNAT structure may be represented as in FIG. 6. That is, FIG. 6 schematically shows an example CALLNAT structure for zIIP eligible non-Java program code. FIG. 6 shows a Natural program header 602 flagged as an NOC object. It includes a NOC prolog routine 604 and a NOC epilog routine 610 sandwiching a Natural Runtime Relocation routine 606 and zIIP-eligible non-Java program code 608. The NOC prolog routine 604 and a NOC epilog routine 610 may be created using the techniques disclosed in the '130 patent in certain example embodiments. The Natural TCB/SRB switch handler routine 612 and PSATOLD handler routine 614 also are included in the Natural program header 602. The Natural Area call 616 is provided to replace the non-Java program code SVCs, and a Natural private abend handler routine 618 also is provided. FIG. 6 also shows a separate Natural non-Java program code TXT member 620, including the culprit table for SVCs and IBM callable routines.

The following code illustrates how a switch is incorporated and executed as part of the non-Java program.

The original machine Code (which typically begins with an SVC or the Branch instruction to a callable IBM routine):

```
....
    ABC      Rx,DEFG
    XY Rz,Ry
....
``` will be saved and replaced inline by the following:

```
....
    BAS      Rx,BeginOfPatchArea
    DC <PatchAreaOffset>
....
```

The PatchArea layout is defined as:

```
BeginOfPatchArea DS       0H
<Code to resolve the correct piece of switch code within the patch
    area>
<The PatchAreaOffset after the above BAS instruction is used.>
....
    B <to finally calculated offset; e.g. P0012>
....
P0012 DS                  0H
    L    Ry,=A(TCBSW)     (to switch into TCB mode)
    BASR Rz,Ry
<saved original code>     z      <-- which will be accessed via the
    culprit table
*                                by the SwitchHandler
* for example:
    ABC                   Rx,DEFG
    XY Rz,Ry
*
    L    Ry,=A(SRBSW)     (to switch back into SRB mode)
    BASR Rz,Ry
    BAS  Rx+2
....
```

The Natural TCB/SRB Switch handler routine contains the following code:

```
/* Natural Switch routine to switch into TCB mode */
TCBSW   DS  0H
TM      RUNMB,RNMBZP        zIIP Support enabled ?
BZR     R14                 no, return
LR      R9,R14              save return address
MVC     ZPCALLER,=CL8'<name of switch type>
MVI     BBZFUN,BBZPSTU      unconditional switch: SRB → TCB
L       R15,BV22RTVC        A(Runtime VCONS table)
L       R15,RTVCZP-NAMRTVC(,R15)
BASR    R14,R15             invoke Natural runtime Switch Routine NATZP
LR      R14,R9              reload return address
BR      R14
/* Natural Switch routine to switch into SRB mode */
SRBSW   DS  0H
MVI     BBZFUN,BBZPTSU      unconditional switch: TCB → SRB
L       R15,BV22RTVC        A(Runtime VCONS table)
L       R15,RTVCZP-NAMRTVC(,R15)
BASR    R14,R15             invoke Natural runtime Switch Routine NATZP
LR      R14,R9              reload return address
BR      R14                 and return
```

The Natural runtime Switch Routine NATZP contains, e.g., the following public IBM Macros to carry out the switch operation.

Switch into TCB:

```
....
SUSPEND SPTOKEN=ZPWSPTOK,MF=(E,ZPWSRBS), SRB HAS TO WAIT      *
    EXIT=ZPXSPXIT,EXITPARM=(R9)          UNTIL RESUMED BY TCB
....
```

Switch into SRB:

```
....
RESUME SPTOKEN=ZPWSPTOK,MF=(E,ZPWSRBR)      TRY TO RESUME THE SRB
....
```

With respect to the additional optimization in the second part of the staged approach mentioned above in certain example embodiments, certain example embodiments may implement caching of non zIIP-eligible loops, which contain, for example Write-Report or Write-Work-file functions. Having inspected the zIIP Component Report, a specific situation can be identified that is further eligible to more optimization. This situation, for example, includes a program Loop in which specific non zIIP-eligible functions are invoked. It is the task of this second level pass to clearly identify this situation and perform further optimization. Assuming that the "culprit" call is a "WRITE Report" function, in this case, the function will be completed replaced by coding that invokes the NATURAL caching routines and leave it the Natural routines to perform the WRITE Report function. All lines of the report can be cached by this Natural function (executing in SRB mode) and the final closing "CLOSE Report" call is also intercepted to call the appropriate Natural runtime function to flush the Report in question. All of the above writing and caching functions do not require a TCB switch. The final and closing "CLOSE" SVC involves this simple switch. That is, when executing a LOOP to write 10,000 lines of a report, for example, this optimization will remove 9,999 switch calls, merely requiring the final CLOSE SVC to be executed in TCB mode.

Similarly, cache handling can be used when scanning non-Java program code for usage of data control blocks (DCBs) and VSAM access method control blocks (ACBs). For example, it is possible to replace GET/PUT calls for DCBs with Natural caching routines (resulting in a reduced number of switches). A buffer flush of the cache can be forced if a CLOSE call occurs for a DCB. VSAM ACBs can be modified to use local shared resources (LSRs) and/or Hyperspace Processing with deferred Writes. Similarly, optimized LSR pools can be built at runtime with VSAM Catalog Information. In some instances, it may be possible to reuse a Natural routine in place of a VSAM Routine. In these examples, Handler Routines can be incorporated into the generated Natural CALLNAT subroutine.

With respect to the additional optimization in the second part of the staged approach mentioned above in certain example embodiments, certain example embodiments may implement optimization of database calls, which are by nature already zIIP-eligible (DB2 and Adabas only). For instance, in addition, specific database calls (which are normally non zIIP-eligible) can further be optimized and executed in SRB mode. In case the database call is an ADABAS call, NATURAL will dynamically gather from the ADABAS runtime (via a runtime call), whether ADABAS is running in SRB-mode or not. In case ABABAS is zIIP-eligible, then all ADABAS calls inside the non-Java program code are invoked in SRB-mode. In the case that the database call is a DB2 call, then the VCONS of the DB2 runtime (found in the CESD record) will be patched with the Natural runtime routine, which supports the DRDA (Distributed Relational Database Architecture) protocol. This Natural routine will then send this DB2 call via a JDBC driver to the DB2 runtime (i.e. using here the TCP/IP protocol). All of the above code is executed in SRB-mode. In addition, in most of these cases (on average about 60%), the DB2 runtime will also decide to execute this call internally in SRB-mode. As above, Handler Routines can be added into the Natural CALLNAT subroutine.

Although certain example embodiments are described in connection with 3GL COBOL or Assembler code or the like being compiled into machine code, it will be appreciated that the techniques described herein could be used in connection with code that is interpreted rather than compiled (such as, for example, Java class code).

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of modifying portions of a program to be executed in a computing environment including a general-purpose processor and a special-purpose processor, the program being represented by object code stored in an executable, the method comprising:

analyzing the object code;
based on the analysis of the object code, identifying culprit calls in the object code, the culprit calls being calls deemed ineligible for execution by the special-purpose processor; and
for each identified culprit call:
inserting, into an allocated area, instructions that cause the program to: temporarily cease executing calls using the special-purpose processor and instead execute the respective culprit call using the general-purpose processor, and return to executing calls using the special-purpose processor following execution of the respective culprit call using the general-purpose processor; and
replacing the respective identified culprit call within the object code with a branch instruction for the allocated area to cause the program to execute the inserted instructions rather than the replaced respective identified culprit call.

2. The method of claim 1, wherein the object code is stored in an object deck and patch areas are locatable as areas in which data needed for execution of the program initially is not stored.

3. The method of claim 1, wherein the special-purpose processor is configured to execute a subset of third-generation language (3GL) code.

4. The method of claim 3, wherein the special-purpose processor is configured to execute Java code but is not configured to execute non-Java 3GL code.

5. The method of claim 1, wherein equivalents to respective culprit calls are implemented as transformed 3GL calls embedded into fourth-generation language (4GL) program headers callable from a 4GL runtime environment.

6. The method of claim 1, wherein equivalents to respective culprit calls are dispatched over a Service Request Block (SRB) to a special-purpose processor.

7. The method of claim 6, wherein the equivalents are embedded into a flagged Natural CALLNAT function.

8. The method of claim 1, wherein the culprit calls are identified as having one of a plurality of predefined types.

9. The method of claim 8, wherein the culprit calls are identified as being database and/or input/output related calls.

10. The method of claim 1, further comprising, for a given identified culprit call determined to have a known pre-programmed optimization, controlling switching between executing calls using the special-purpose processor and the general-purpose processor in accordance with the known pre-programmed optimization and omitting the locating, inserting, and replacing.

11. The method of claim 10, wherein the given identified culprit call relates to report writing in a loop.

12. The method of claim 10, wherein the known pre-programmed optimization includes local caching and switching upon a cache becoming filled and needing to be flushed.

13. The method of claim 1, further comprising, for a given identified culprit call:
calling an external service to determine whether a target of the given identified culprit call provides special-purpose processor eligible functionality; and
in response to a determination that the target provides special-purpose processor eligible functionality, dispatching the given identified culprit call on the special-purpose processor and omitting the locating, inserting, and replacing.

14. The method of claim 13, wherein the target is a database and the given identified culprit call is a database-related function call.

15. The method of claim 14, wherein the service is the database itself.

16. A non-transitory computer readable storage medium tangibly storing instructions for modifying portions of a program to be executed in a computing environment including a general-purpose processor and a special-purpose processor, the program being represented by object code stored in an executable, the instructions, when performed, causing the computing environment to at least:
analyze the object code;
based on the analysis of the object code, identify culprit calls in the object code, the culprit calls being calls deemed ineligible for execution by the special-purpose processor; and
for each identified culprit call:
insert, into an allocated area, instructions that cause the program to, temporarily cease executing calls using the special-purpose processor and instead execute an equivalent to the respective culprit call using the general-purpose processor, and return to executing calls using the special-purpose processor following execution of the respective culprit call using the general-purpose processor; and
replace the respective identified culprit call in the object code with a branch instruction for the allocated area to cause the program to execute the inserted instructions rather than the replaced respective identified culprit call.

17. The non-transitory computer readable storage medium of claim 16, wherein the object code is stored in an object deck and patch areas are locatable as areas in which data needed for execution of the program initially is not stored.

18. The non-transitory computer readable storage medium of claim 16, wherein the special-purpose processor is configured to execute a subset of third-generation language (3GL) code.

19. The non-transitory computer readable storage medium of claim 18, wherein the special-purpose processor is configured to execute Java code but is not configured to execute non-Java 3GL code.

20. The non-transitory computer readable storage medium of claim 16, wherein equivalents to respective culprit calls are dispatched over a Service Request Block (SRB) to a special-purpose processor.

21. The non-transitory computer readable storage medium of claim 16, wherein, for a given identified culprit call determined to have a known pre-programmed optimization, switching between executing calls using the special-purpose processor and the general-purpose processor is controlled in accordance with the known pre-programmed optimization and omitting the locating, inserting, and replacing.

22. The non-transitory computer readable storage medium of claim 16, further comprising, for a given identified culprit call:
calling an external service to determine whether a target of the given identified culprit call provides special-purpose processor eligible functionality; and
in response to a determination that the target provides special-purpose processor eligible functionality, dispatching the given identified culprit call on the special-purpose processor and omitting the locating, inserting, and replacing.

23. A computing system, comprising:
a general-purpose processor and a special-purpose processor; and
a program to be executed, the program being represented by object code stored in an executable;

wherein the computing system is controllable to perform functionality comprising:

analyzing the object code;

based on the analysis of the object code, identifying culprit calls in the object code, the culprit calls being calls deemed ineligible for execution by the special-purpose processor; and for each identified culprit call:

inserting, into an allocated area, instructions that cause the program to, temporarily cease executing calls using the special-purpose processor and instead execute an equivalent to the respective culprit call using the general-purpose processor, and return to executing calls using the special-purpose processor following execution of the respective culprit call using the general-purpose processor; and replacing the respective identified culprit call in the object code with a branch instruction for the allocated area to cause the program to execute the inserted instructions rather than the replaced respective identified culprit call.

24. The system of claim 23, wherein the object code is stored in an object deck and patch areas are locatable as areas in which data needed for execution of the program initially is not stored.

25. The system of claim 23, wherein the special-purpose processor is configured to execute a subset of third-generation language (3GL) code.

26. The system of claim 25, wherein the special-purpose processor is configured to execute Java code but is not configured to execute non-Java 3GL code.

27. The system of claim 23, wherein equivalents to respective culprit calls are dispatched over a Service Request Block (SRB) to a special-purpose processor.

28. The system of claim 23, wherein, for a given identified culprit call determined to have a known pre-programmed optimization, switching between executing calls using the special-purpose processor and the general-purpose processor is controlled in accordance with the known pre-programmed optimization and omitting the locating, inserting, and replacing.

29. The system of claim 23, further comprising, for a given identified culprit call:

calling an external service to determine whether a target of the given identified culprit call provides special-purpose processor eligible functionality; and in response to a determination that the target provides special-purpose processor eligible functionality, dispatching the given identified culprit call on the special-purpose processor and omitting the locating, inserting, and replacing.

30. A method of executing a program in a computing environment including a general-purpose processor and a special-purpose processor, the program being represented by object code stored in an executable, the object code having identifiable culprit calls located therein, the identifiable culprit calls being calls being ineligible for execution by the special-purpose processor, the method comprising:

executing the program using the special-purpose processor; and responsive to each identifiable culprit call being encountered during execution of the program using the special-purpose processor:

inserting, into an allocated area, instructions that cause the program to, temporarily cease executing calls using the special-purpose processor and instead execute an equivalent to the respective culprit call using the general-purpose processor, and return to executing calls using the special-purpose processor following execution of the respective culprit call using the general-purpose processor; and replacing the respective identified culprit call with a branch instruction for the allocated area to cause the program to execute the inserted instructions rather than the replaced respective identified culprit call.

* * * * *